US008911549B2

(12) United States Patent
Jonkers

(10) Patent No.: US 8,911,549 B2
(45) Date of Patent: Dec. 16, 2014

(54) HEALING AGENT FOR SELF-HEALING CEMENTIOUS MATERIAL

(75) Inventor: Hendrik Marius Jonkers, Delft (NL)

(73) Assignee: Technische Universiteit Delft, Delft (NL)

( * ) Notice: Subject to any disclaimer, the term of this patent is extended or adjusted under 35 U.S.C. 154(b) by 135 days.

(21) Appl. No.: 13/639,840

(22) PCT Filed: Apr. 6, 2011

(86) PCT No.: PCT/NL2011/000026
§ 371 (c)(1),
(2), (4) Date: Dec. 18, 2012

(87) PCT Pub. No.: WO2011/126361
PCT Pub. Date: Oct. 13, 2011

(65) Prior Publication Data
US 2013/0112114 A1 May 9, 2013

(30) Foreign Application Priority Data
Apr. 7, 2010 (NL) ...................................... 2004520

(51) Int. Cl.
*C04B 7/00* (2006.01)
*C04B 16/00* (2006.01)
(Continued)

(52) U.S. Cl.
CPC ............. *C04B 20/10* (2013.01); *C04B 20/1022* (2013.01); *C04B 20/12* (2013.01); *C04B 28/02* (2013.01); *C04B 40/0042* (2013.01); *C04B 2103/0001* (2013.01); *C04B 2111/2038* (2013.01)

USPC ........... 106/802; 106/499; 106/603; 106/634; 106/708; 424/490

(58) Field of Classification Search
USPC ........... 106/708, 803, 634, 603, 499; 424/490
See application file for complete search history.

(56) References Cited

FOREIGN PATENT DOCUMENTS

EP 2 082 999 A1 7/2009

OTHER PUBLICATIONS

Achal, Varenyam. "What is Biocement". Civil Engineering Portal. Retrieved on Apr. 2, 2004. Retrieved from http://www.engineeringcivil.com/what-is-biocement.html.*

(Continued)

*Primary Examiner* — Kaj K Olsen
*Assistant Examiner* — Karam Hijji
(74) *Attorney, Agent, or Firm* — Sunit Talapatra

(57) ABSTRACT

The invention provides a process for the production of a cementious material. The process comprises mixing cement starting materials and a particulate healing agent to provide the cementious material. The healing agent comprises coated particles, wherein the coated particles comprise bacterial material and additive. The bacterial material is selected from the group consisting of a bacterium, a lyophilized bacterium and a bacterial spore of a bacterium. The present invention solves these problems, as (substantially leakage-proof) tablets containing the actual healing agent may neither interfere with either the workability of the liquid mixture ("cementious material") nor negatively affect properties of either mixture or final material (hardened concrete), even when applied in large quantities. During crack formation in cementious based constructions, the particles also crack, and healing agent is released.

41 Claims, 3 Drawing Sheets

(51) Int. Cl.
*C04B 24/00* (2006.01)
*C04B 24/10* (2006.01)
*C08K 5/00* (2006.01)
*C04B 14/12* (2006.01)
*C04B 16/08* (2006.01)
*C04B 38/00* (2006.01)
*C04B 38/08* (2006.01)
*C04B 14/00* (2006.01)
*C04B 18/06* (2006.01)
*A61K 9/16* (2006.01)
*A61K 9/50* (2006.01)
*C04B 20/10* (2006.01)
*C04B 20/12* (2006.01)
*C04B 28/02* (2006.01)
*C04B 40/00* (2006.01)
*C04B 103/00* (2006.01)
*C04B 111/20* (2006.01)

(56) References Cited

OTHER PUBLICATIONS

International Search Report mailed Aug. 28, 2011 in International Application No. PCT/NL2011/000026.

International Preliminary Report on Patentability mailed Mar. 20, 2012 in International Application No. PCT/NL2011/000026.

Jonkers, Henk M. et al., "Application of bacteria as self-healing agent for the development of sustainable concrete," Ecological Engineering, vol. 36, 2010, pp. 230-235.

Jonkers, Henk M. et al., "A two component bacteria-based self-healing concrete," Concrete Repair, Rehabilitation and Retrofitting II, Oct. 21, 2008, pp. 215-220.

White, S.R. et al., "Autonomic healing of polymer composites," Nature, vol. 409, Feb. 15, 2001, pp. 794-797.

\* cited by examiner

HEALING AGENT FOR SELF-HEALING CEMENTIOUS MATERIAL

CROSS-REFERENCE TO RELATED APPLICATION(S)

This application is the National Phase of International Patent Application No. PCT/NL2011/000,026, filed Apr. 6, 2011, published as WO 2011/126361, which claims priority to Netherland Application No. 2004520, filed Apr. 7, 2010. The contents of these applications are herein incorporated by reference in their entirety.

FIELD OF THE INVENTION

The invention relates to a process for the production of a cementious material. The invention also relates to a particulate healing agent for a cementious material, as well as to a process for the production thereof. Further, the invention relates to a cementious based construction that can be made from the cementious material according to the invention.

BACKGROUND OF THE INVENTION

Autogenously crack-healing of concrete has been recognized in the art. Mainly micro-cracks with widths typically in the range of 0.05 to 0.1 mm have been observed to become completely sealed particularly under repetitive dry/wet cycles. The mechanism of this autogenously healing is mainly due to secondary hydration of non- or partially reacted cement particles present in the concrete matrix. Due to capillary forces water is repeatedly drawn into micro cracks under changing wet and dry cycles, resulting in expansion of hydrated cement particles due to the formation of calcium silicate hydrates and calcium hydroxide (Portlandite). These reaction products are able to completely seal cracks provided that crack widths are small. Larger sized cracks can only be partially filled due to the usually limited amount of non-reacted cement particles present. In the latter case healing activity is insufficient as it results only in the formation of a thin layer of hydration products on the crack surface. Besides secondary hydration, also the process of carbonation can contribute to the crack-sealing capacity of commonly applied concrete. This reaction is also expansive, as ingress atmospheric carbon dioxide ($CO_2$) reacts with calcium hydroxide (Portlandite) particles present in the concrete matrix to yield various calcium carbonate minerals such as calcite, aragonite and vaterite.

From a durability perspective, rapid sealing of particularly freshly formed surface cracks is important as this process can substantially delay the ingress of water and other aggressive chemicals into the concrete matrix and thus prevent early material degradation. Several chemicals such as sulphate, chloride and acids are known to dramatically increase concrete matrix degradation and corrosion of embedded steel reinforcement causing a serious threat to the materials performance and durability. One possibility to improve the self-healing capacity of cementious materials is by decreasing the water/cement ratio of the original mixture. A substantial increase in the relative amount of cement or binder in the mixture results in formation of a self-healing buffer, i.e. the presence of a significant amount of non- or only partially reacted binder particles present in the material matrix. Typical examples of such low water to binder ratio types of concrete are high strength or high performance concretes. As recent studies have shown, such concretes do indeed possess a superior crack-sealing capacity compared to ordinary concretes characterized by higher water to cement ratio's.

However, from an environmental viewpoint the latter concrete types (i.e. ordinary types) are preferred as less cement per concrete volume is used. The lower the amount of cement in concrete the lower the environmental pressure in terms of atmospheric $CO_2$ emissions. Although high strength concrete allows building of more slender structures than ordinary concrete and thus need less concrete volume, the total amount of cement used is still significantly higher due to the inherent high percentage of non- or partially hydrated cement particles in the material matrix. The development of a self-healing mechanism in concrete that is based on a potentially cheaper and more sustainable material than cement could thus be beneficial for both economy and environment.

Although bacteria, and particularly acid-producing bacteria, have been traditionally considered as harmful organisms for concrete, recent research has shown that specific species such as ureolytic and other types of calcite-producing bacteria can actually be useful as a tool to repair surface cracks in concrete. In some studies bacteria were externally and manually applied on the concrete surface. Species from the *Bacillus* group appear promising intrinsic agents as their spores, specialized thick-walled dormant cells, have been shown to be viable for over 200 years under dry conditions. Such bacteria would comprise one of the two components for the envisioned autogenous healing system.

For crack repair filler material is needed, and bacteria can produce that by metabolic conversion of a suitable organic component. The nature of metabolically produced filler material could be bio-minerals such as calcite. These calcium carbonate based minerals are relatively dense and can block cracks, and thus hamper ingress of water efficiently, as was previously demonstrated.

One particular challenge in the development of self healing materials is the need to incorporate sufficient healing agent in the material matrix. As the healing capacity, i.e. the volume of cracks that can potentially be filled may directly be related to the amount of precursor material present, a substantial volume of the material needs to be reserved in order to obtain a significant healing potential. While the matrix-incorporated bacteria function as catalyst and therefore need only a limited volume, it is typically the mineral precursor compound, the second component of the healing system, which will occupy a substantial volume when a significant healing capacity is needed. Particularly for larger cracks to become completely sealed, bulky internal reservoirs or alternatively an intrinsic transportation mechanism is needed. In concrete the latter could be provided by the water-filled continuous capillary pore system which is usually present. The mineral precursor compound could be present in dissolved state in the matrix pore water without affecting strength properties of the material what presumably occurs when specific internal healing agent containing reservoirs are needed. In any case however, incorporated bacteria and the mineral precursor compound should compromise concrete strength properties only to an acceptable extend.

WO2009093898 (EP2082999) describes a healing agent in cement-based materials and structures, wherein said healing agent comprises organic compounds and/or bacteria-loaded porous particles, which porous particles comprise expanded clay- or sintered fly ash. Furthermore, said porous particles are intact spheres, broken or crushed particles derived from said intact spheres, having a specific density between 0.4 and 2 g cm$^{-3}$. WO2009093898 also describes a process for the preparation of the healing agent.

Jonkers et al. describe in Ecological Engineering 36 (2010) 230-235 an investigation to the potential of bacteria to act as self-healing agent in concrete, i.e. their ability to repair occurring cracks. A specific group of alkali-resistant spore-forming bacteria related to the genus *Bacillus* was selected for this purpose. Bacterial spores directly added to the cement paste mixture remained viable for a period up to 4 months.

Further, Jonkers et al. describe in Concrete Repair, Rehabilitation and Retrofitting II, Alexander et al. (eds) 2009, Taylor & Francis Group, London, ISBN 978-0-415-46850-3 the development of a two-component self-healing system which is composed of bacteria which catalyse the metabolic conversion of organic compounds to calcite. Both components were mixed with the fresh cement paste, thus becoming an integral part of the concrete. Experimental results seemed to show that ingress water channel through freshly formed cracks activate present bacteria which through metabolic conversion of organic mineral-precursors compounds produce copious amounts of calcite.

SUMMARY OF THE INVENTION

Healing agents for autonomous repair of damaged concrete have to be incorporated in the material matrix and should therefore be compatible not only with the final material (i.e. hardened concrete, or hardened mortar) but also with the initial liquid mixture. The amount of healing agent added relates to the healing capacity (the more healing agent added, the higher the healing capacity). However, larger volumes of healing agent usually negatively affect other material properties such as workability of the liquid mixture and strength of the final product (hardened concrete, or hardened mortar). It appeared that with prior art solutions the concrete provided might only be used in non-constructing applications, such as intermediate walls, and not in constructions that should be able to bear other part of the constructions. This seemed due to the fact that the amount of healing agent in the cementious mixture to be effective, had to be too high to provide strong constructions. Thus, healing agents of the art led to concrete that could not easily be used in (high-) strength concrete applications.

Hence, it is an aspect of the invention to provide an alternative healing agent, as well as to a process for the production thereof, and also to a process for the production of a cementious based construction, which preferably further at least partly obviate one or more of above-described drawbacks.

The present invention solves these problems, as (substantially leakage-proof) tablets containing the actual healing agent may neither interfere with either the workability of the liquid mixture ("cementious material") nor negatively affect properties of either mixture or final material (hardened concrete or hardened mortar), even when applied in large quantities. This invention is a major improvement of the currently applied system (healing agent directly added to the concrete mixture, or immobilization in porous aggregates) as it allows application of higher quantities of healing agent (improving healing capacity) as well as improvement of workability of the concrete mixture and improvement of other concrete features such as strength.

Moreover, the production of healing agent-containing tablets may be technically easier and cheaper than the production of healing agent-filled porous aggregates (such as described in WO2009093898). A further major advantage may be that the chemical composition of the tablet-encapsulated healing agent can be much more variable as chemical compatibility with either liquid concrete mixture or final product (hardened concrete) is less critical when the tablet-coating consists of leakage-proof material.

Hence, in a first aspect, the invention provides a process for the production of a cementious material, the process comprising mixing cement starting materials and a particulate healing agent to provide the cementious material, wherein the healing agent comprises coated particles, wherein the coated particles comprise bacterial material and additive, and wherein the bacterial material is selected from the group consisting of a bacterium, a lyophilized bacterium and a bacterial spore of a bacterium.

The coating may protect the particle during the process for the production of the cementious based material, but when in the cementious based construction cracks are formed (during hardening), the particles may also break/crack. In this way, healing agent is released and can at least partly heal the crack.

Herein, the term "cementious material" relates to materials, especially in a non-hardened state, that comprise cement and that can be used to make constructions. Cement is a known binder to make constructions, such as walls, houses, department houses, bridges, viaducts, etc. The cementious material may especially be mortar or concrete. Mortar is a workable paste used to bind construction blocks together and fill the gaps between them. Concrete is a construction material composed of cement (commonly Portland cement) as well as other materials such as fly ash and slag cement, aggregate (generally a coarse aggregate such as gravel, limestone, or granite, plus a fine aggregate such as sand), water, and chemical admixtures. Hence, the term "cementious material" especially relates to pastelike or flowable material that is used in constructions as mortar or concrete. Hence, the term "cement starting materials" especially relates to cement, water, and other (conventional) additives that are used to make cementious material (such as mortar or concrete) that can be used for construction, such as mortar or concrete.

The healing agent, when incorporated in concrete or other cement-based materials, may perform autonomous repair of cracks formed in the material when activated by water. The agent comprises the bacterial material and preferably also an additive. The bacteria are especially provided in dried (powder) form and can especially be either lyophilized vegetative cells or dried bacterial spores. Hence, the bacterial material is selected from the group consisting of a bacterium, a lyophilized bacterium and a bacterial spore of a bacterium.

The term "bacterial material" may also refer to a combination of bacterial materials, such as a combination of two or more of the bacterium, the lyophilized bacterium and the bacterial spore of a bacterium. The term "bacterial material" may alternatively or additionally also refer to a combination of different types of bacteria, such as two or more of *Planococcus, Bacillus* and *Sporosarcina*, or such as a combination of an anaerobic bacterium and an aerobic bacterium.

Further, the healing agent comprises an additive. The additive may comprise one or more organic and/or calcium-containing compounds which can be metabolically converted by active bacteria in an alkaline environment to bio-minerals such as calcium carbonate or calcium phosphate. The organic and/or calcium-containing compounds may produce, after metabolic conversion by bacteria in an alkaline environment, phosphate and/or carbonate ions, and calcium ions, which form substantially water insoluble precipitates such as calcium carbonate based minerals (like calcite, aragonite, vaterite) and/or calcium phosphate based minerals (e.g. apatite). Examples of organic and/or calcium-containing compounds are organic calcium salts, such as calcium formate, calcium acetate, calcium lactate, calcium gluconate, a carbohydrate, a fatty acid, a amino acid, a lactate, a maleate, a formate, a sugar, a pyruvate and an organic phosphate containing compounds, such as a phytate. The calcium-based precursors are herein also indicated as "biomineral precursor" or "calcium biomineral precursor".

In yet a further embodiment, the additive comprises a bacterial growth factor, such a selected from the group consisting of a yeast extract, a peptone, an aspartate, a glutamate and trace elements. Preferably, the bacterial growth factor comprises trace elements and one or more selected from the group consisting of a yeast extract, a peptone, an aspartate, and a glutamate. The trace element especially comprises one or more elements selected from the group comprising Zn, Co, Cu, Fe, Mn, Ni, B, P and Mo.

Especially, the additive may comprise one or more compounds selected from the group consisting of an organic compound, preferably selected from the group consisting a yeast extract, a peptone, a carbohydrate, a fatty acid, an amino acid, a lactate, a glutamate, an aspartate, a glutamate, a maleate, a formate, a sugar and a pyruvate.

Therefore, in a preferred embodiment, the additive comprises (1) one or more compounds selected from the group consisting of calcium formate, calcium acetate, calcium lactate, calcium gluconate, a carbohydrate, a fatty acid, a amino acid, a lactate, a maleate, a formate, a sugar, a pyruvate and a phytate and (2) a bacterial growth factor, preferably selected from the group consisting of a yeast extract, a peptone, an aspartate, a glutamate and trace elements. Preferably, the additive comprises a calcium compound and an organic compound (such as, a carbohydrate, a fatty acid, a amino acid, a lactate, a maleate, a formate, a sugar, and a pyruvate), as well as trace elements and one or more of a yeast extract, a peptone, an aspartate, and a glutamate. Instead of or in addition to the organic compound, the additive may also comprise a phytate. In an especially preferred embodiment, the additive comprises (a) a calcium compound, (b) one or more of an organic compound and a phosphor compound (such as phytate), (c) trace elements and (d) one or more of a yeast extract, a peptone, an aspartate, and a glutamate. The additive may herein also be indicated as bacterial metabolism additive, i.e. an additive that is used in the metabolism or assists in the metabolism.

Hence, in an embodiment, the bacterium is selected from the group consisting of bacteria that can form a phosphate or a carbonate precipitate in an alkaline medium (such as calcium carbonate or a calcium phosphate based mineral, like apatite). Further, in an embodiment the additive comprises a calcium compound, especially one or more selected from the group comprising calcium formate, calcium acetate, calcium lactate, and calcium gluconate.

In an embodiment, the bacterium is selected from the group consisting of aerobic bacteria. An advantage of using aerobic bacteria may be that healing agents comprising bacterial material of aerobic bacteria may be used in application wherein the hardened cementious material is exposed to aerobic conditions.

In another embodiment, the bacterium is selected from the group consisting of anaerobic bacteria. An advantage of using anaerobic bacteria may be that healing agents comprising bacterial material of anaerobic bacteria may be used in application wherein the hardened cementious material is exposed to anaerobic conditions, such as underground applications.

Preferred bacteria are selected from the group of (facultative aerobic bacteria from genera such as) *Planococcus, Bacillus* and *Sporosarcina*, especially *Bacillus*. Especially bacteria are selected which can grow by anaerobic fermentation and/or anaerobic nitrate reduction.

The weight ratio bacterial material:additive of the particulate healing agent may especially be in the range of 1:10,000-1:1,000,000, i.e. 1 mg bacterial material for 10 gram-1 kg additive.

The weight ratio of the two sub fractions of the additive fraction of the healing agent, i.e. the biomineral precursor compound (from which calcium carbonate or calcium phosphate-based minerals are produced after metabolic conversion by bacteria) and the bacterial growth factors (e.g. yeast extract, peptone, amino acids, trace elements) may especially be in the range of 10:1-1000:1, i.e. 1 gram bacterial growth factor for 10 gram to 1 kg biomineral precursor compound.

The components of the healing agent are preferably provided in a dry or dried state (powder-form) and suitable proportions and (then) pressed to tablets and coated, such as with a cement- and concrete compatible layer. The coating is preferably physically (mechanically) strong enough and chemically resilient to resist breaking and dissolution during the process of concrete- or cement-based material preparation procedure (e.g. preparation of the concrete mixture and casting process). Further, the coating preferably forms a stable physical bonding with the cement-based material during setting (hardening) of the cement-based mixture in order to contribute to overall strength development of the cement-based material. And preferably, the coating encompassing the healing agent once incorporated in the set cement-based material should preferably be weaker than the surrounding cement stone matrix to allow cracks formation in the set cement-based material to rupture the coating to enable release of the healing agent.

To this end, the invention provides in a further aspect a process for the production of a particulate healing agent, the process comprising processing a mixture of bacterial material, an additive, and optionally a second additive into a tablet and coating the tablet, wherein the bacterium is preferably selected from the group of genera consisting of *Planococcus, Bacillus* and *Sporosarcina*, and wherein the additive comprises one or more compounds selected from the group consisting of calcium formate, calcium acetate, calcium lactate, calcium gluconate, a carbohydrate, a fatty acid, a amino acid, a lactate, a maleate, a formate, a sugar, a pyruvate and a phytate and wherein the additive preferably comprises a bacterial growth factor, preferably selected from the group consisting of yeast extract, a peptone, an aspartate, a glutamate and trace elements.

In a specific embodiment, the process for the production of a particulate healing agent comprises coating the tablet with one or more coating methods selected from the group consisting of spray drying, prilling, fluid bad coating, v-blending, hot blending, spheroidiziation, and tablet coating, techniques which are known in the art. The optional second additive may be a pelleting agent, like a carrier (such as zeolite, clay), a disintegrant, a glidant, a lubricant, a granulating agent, a thickening agent, binders (such as starch, lactose, cellulose), etc.

Therefore, the invention provides in a further aspect also coated particles (i.e. the particulate healing agent) obtainable by processing a mixture of bacterial material, the additive, and optionally a second additive, into a tablet and coating the tablet.

Especially, the invention further provides a particulate healing agent for a cementious material, wherein the healing agent comprises coated particles and wherein the particles comprise bacterial material and additive, wherein the bacterial material is selected from the group consisting of a bacterium, a lyophilized bacterium and a bacterial spore of a bacterium, wherein the bacterium is preferably selected from the group of genera consisting of *Planococcus, Bacillus* and *Sporosarcina*, especially *Bacillus*, and wherein the additive comprises one or more compounds selected from the group consisting of calcium formate, calcium acetate, calcium lactate, calcium gluconate, a carbohydrate, a fatty acid, a amino acid, a lactate, a maleate, a formate, a sugar, a pyruvate and a phytate and wherein the additive preferably comprises a bacterial growth factor, preferably selected from the group consisting of yeast extract, a peptone, an aspartate, a glutamate and trace elements.

As mentioned above, in a specific embodiment, the coating of the coated particles may be obtainable by one or more coating methods selected from the group consisting of spray drying, prilling, fluid bad coating, v-blending, hot blending, spheroidiziation, and tablet coating.

The coated particles may especially comprise at least 50 wt. %, more preferably at least 75 wt. % bacterial material and additive, relative to the total weight of the coated particles. Further, the coated particles may especially have mean dimensions in the range of 0.2-4 mm. Herein, with the term "dimensions" are length, width, height, and diameter(s) meant. In an embodiment, the coated particles may have a coating thickness in the range 5 μm-2 mm.

In a specific embodiment, the coating comprises a (co) polymer based coating based on one or more monomer types selected from the group comprising glycolide, lactide, ε-caprolactone, δ-valerolactone, N-vinylcaprolactam, 3,6-dimethyl-1,4-dioxane-2,5-dione, glycosyloxyethyl methacrylate, 1,6-bis(p-acetoxycarbonylphenoxy)hexane, and (3S)-cis-3,6-dimethyl-1,4-dioxane-2,5-dione. As will be clear to the person skilled in the art, the coating may be a multi-layer coating. Further, the coating may comprise one or more of the herein indicated monomers as constituting groups. Such coatings may, within the hardened cementious material, break under pressure (such as due to crack formation), and in this way release the healing agent. In another embodiment, the coating may comprise an epoxy based (co)polymer. Such epoxy based coating may be relatively hard, and may thereby contribute to concrete (compressive) strength.

The coated particles may have a mean particle hardness in the range of 3-9 according to Mohs scale, especially in the range of 4-7, like 4-5. Such strength may allow processing into the cementious material and (later) cementious construction, without a substantial damage or with acceptable damage of the particles, whereas when cracks form during hardening of the cementious constructions, the hardness is in such a range that the particles may also crack. Apatite for instance, may have a Mohs hardness of 5; and $CaCO_3$ a Mohs hardness of 3.

The cement starting materials and the particulate healing agent are mixed together. This can be done in conventional ways, during the (conventional) process of making cementious material. In an embodiment, the weight ratio cement starting materials and particulate healing agent is in the range of 2,000:1-20:1, preferably in the range of 500:1-50:1 (including water). The weight ratio cement starting materials and bacterium may especially be in the range of $1.10^6:1$-$1.10^8:1$, preferably in the range of $25.10^6:1$-$25.10^7:1$.

With this cementious material constructions can be made or erected that have self-healing properties. In further aspect, the invention (thus) also provides a process for the production of a cementious based construction, comprising providing the cementious material as described herein, such as obtainable by the process for the production of cementious material as described herein, and constructing the cementious based construction from the cementious material. After construction, the cementious based material is allowed to harden. The cement starting materials comprise Portland cement. In an embodiment, the cementious material comprises concrete.

The invention provides in a further aspect also (such) cementious based construction comprising hardened cementious material, wherein the cementious material is obtainable by the process for the production of cementious material as described herein. In such construction, part of the water may have escaped, and the cementious material has hardened. In a further aspect, the invention provides (such) cementious-based construction comprising hardened cementious material, the hardened cementious material further comprising bacterial material, wherein the bacterial material is selected from the group consisting of a bacterium, a lyophilized bacterium and a bacterial spore of a bacterium, wherein the bacterium is preferably selected from the group of genera consisting of *Planococcus, Bacillus* and *Sporosarcina*, and wherein the weight ratio hardened cementious material and bacterium is preferably in the range of $1.10^6:1$-$1.10^8:1$, preferably in the range of $25.10^6:1$-$25.10^7:1$. For instance, the cementious-based construction may be a wall, a floor, a viaduct, a bridge, a pillar, a pile, etc. The bacterial material may thus be contained by the cementious based construction, and may be "dispersed" therein. The hardened cementious materials may thus contain bacterial material.

The cementious-based construction may further contain remains of the coating, i.e. for instance (co)polymer as defined above (as (former) coating material) will remain in the cementious-based construction. Hence, material that has been used to form the coating, may also be present in the cementious-based construction, in addition to the bacterium (and of course hardened cementious material).

The invention further provides a cementious based material obtainable by the process of the invention (for production of the cementious based material). Hence, the invention also provides cementious material, comprising cement starting materials and a particulate healing agent wherein the healing agent comprises coated particles, wherein the coated particles comprise bacterial material and additive, and wherein the bacterial material is selected from the group consisting of a bacterium, a lyophilized bacterium and a bacterial spore of a bacterium. The cementious based material may thus contain the bacterial material.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

It is clear for the person skilled in the art that embodiments may be combined. The phrase "one or more of" is equivalent to "one or more selected from the group consisting of".

BRIEF DESCRIPTION OF THE DRAWINGS

Embodiments of the invention will now be described, by way of example only, with reference to the accompanying schematic drawings in which corresponding reference symbols indicate corresponding parts, and in which.

DESCRIPTION OF PREFERRED EMBODIMENTS

Figure 1:
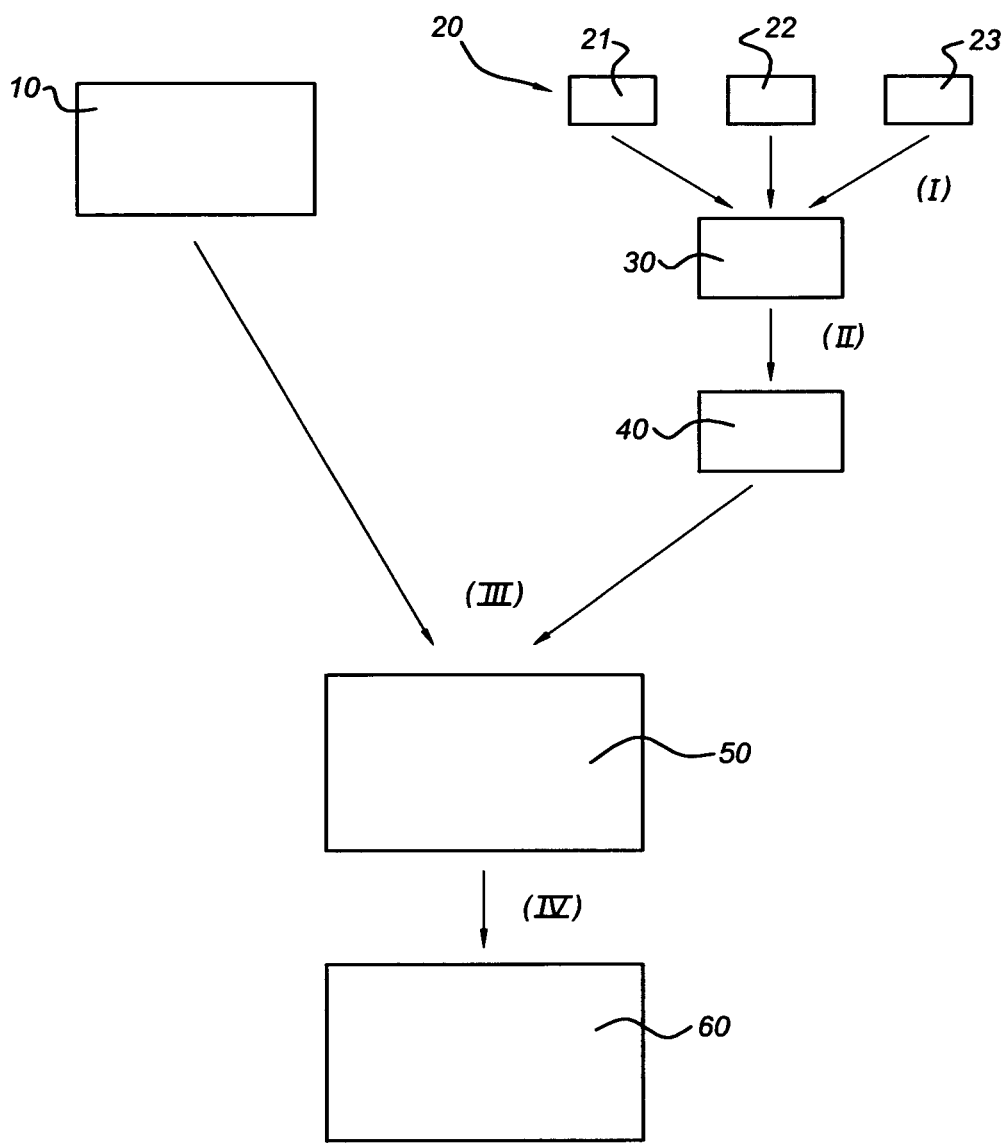
FIG. 1 schematically depicts how the cementious material can be produced and used.

FIG. 1 schematically depicts how the cementious material can be produced and used. In the block scheme, reference 10 indicates the cement starting materials. References 21, 22 and 23, respectively, indicate the bacterial material, calcium phosphate and/or calcium carbonate precursor material, and nutrition for the bacteria. These healing agent starting materials are in general indicated with reference 20. The starting materials for the healing agent are processed into a particle, such as a tablet. The process is indicated with reference (I); the particle (stage) is indicated with reference 30. Thereafter, the particles are coated in a coating process (II) into coated particles (stage) 40. Thereby, the particulate healing agent is obtained, which is thus schematically indicated with reference 40. The particulate healing agent 40 and the cement starting materials 10 are mixed in a process III into the cementious material (stage), indicated schematically with reference 50. The cementious material 50 can be processed in a (hardened) construction, indicated with reference 60.

Figure 2A:
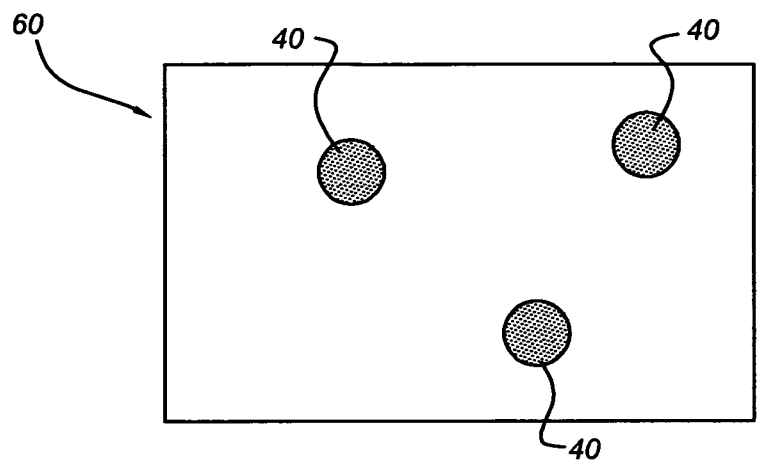
FIGS. 2a-2b schematically show how the healing agent may have its function in a hardened cementious product.
Figure 2B:
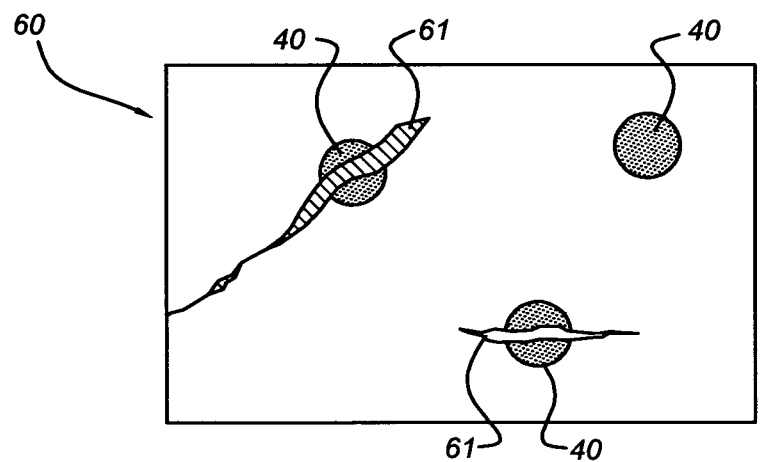

FIGS. 2a-2b schematically depict what may happen with the healing agent during hardening of the cementious based construction 60. FIG. 2a schematically depicts the situation of the cementious based construction 60 just after construction. With time, cracks 61 may form in the cementious based construction 60. Crack formation may also induce cracking/disintegration of the particulate healing agent 40. By damage of the particles of the particulate healing agent 40, healing agent may be released, which may at least partially heal the crack 61. In this way, the durability and lifetime of the cementious based construction 60 and the strength of the cementious based construction 60 may be improved.

Figure 3:
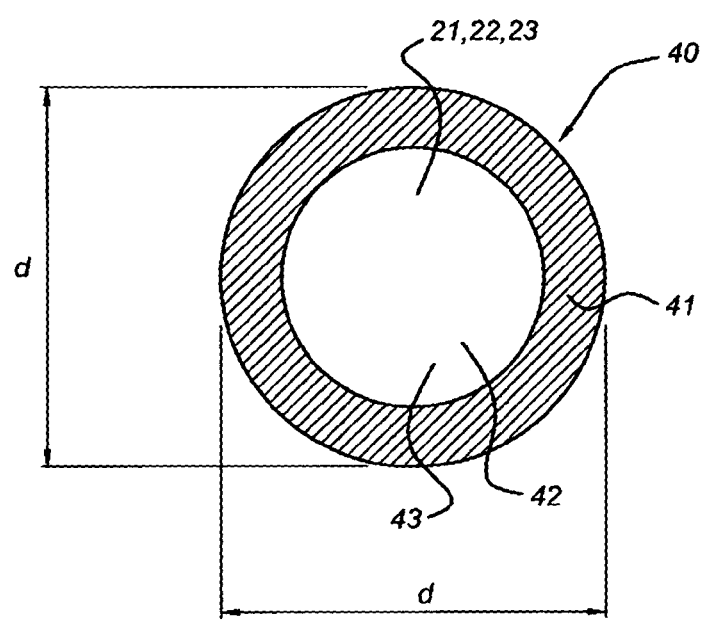
FIG. 3 schematically depicts a particle of the particulate healing agent.

FIG. 3 schematically depicts a coated particle of the particulate healing agent 40, having a coating 41, surrounding a nucleus 42. The nucleus 42 comprises the healing agent 43, which comprises bacterial material 21, precursors of calcium phosphate or calcium carbonate material 22 and nutrition 23, such as a yeast extract, gluconate and trace elements.

EXAMPLES

Below table provides some examples of healing agents according to the invention, wherein the weight ratio of bacterial material and additive is indicated:

TABLE 1 examples of healing agents according to the invention

| | Type of bacterial material | Amount of bacterial material | Type of phosphate or carbonate precursor | Amount of phosphate or carbonate precursor | Type of nutrient | Amount of nutrient |
|---|---|---|---|---|---|---|
| Ex. 1 | Dried *Bacillus cohnii* spores | 1 mg | Calcium gluconate and glucose | 170 g | yeast extract and trace elements | 3.5 g |
| Ex. 2 | Dried alkaliphilic *Bacillus* spp. spores | 5 mg | Calcium lactate and calcium nitrate | 250 g | peptone and trace elements | 5 g |
| Ex. 3 | Lyophilized *Planococcus* spp. | 0.1 g | Calcium acetate and glucose | 1 kg | Glutamate and trace elements | 50 g |
| Ex. 4 | Lyophilized *Planococcus* and dried *Bacillus* spp. spores | 50 mg | Phytate and calcium gluconate | 1 kg | yeast extract and trace elements | 25 g |

Further Experiments

In order to investigate whether addition of bacteria-based healing agent to concrete admixtures in form of coated pressed powder particles such as tablets is more beneficial than immobilization in porous particles such as expanded clays as described in prior art an experimental study was performed.

In this experiment a comparison is made in compressive strength development of mortar specimens made from a 'standard' mixture, a mixture with added expanded clay particles containing a bacteria-based healing agent according to prior art, and a mixture with added coated pressed powder tablets, in correspondence with the invention, containing 2.7 times the amount of bacteria-based healing agent as applied in the expanded clay-based mixture. Rationale for this experiment is to quantify compressive strength development of mortar specimens with and without added self-healing agent, and to compare whether healing agent in form of coated pressed powder tablets results in less compressive strength loss of concrete specimens in comparison to expanded clay-based healing agent as described in prior art.

Table 2 lists the concrete mixture composition used for preparation of mortar specimens. Series A represents a mixture in which the 1-4 mm sand fraction has been replaced for Liapor light weight aggregates impregnated with bacterial spores and nutrients according to prior art. Series B represents a 'standard' (control) mixture. Series C represents a mixture in which part of the 1-4 mm sand fraction has been replaced for coated pressed powder tablets containing bacterial spores and nutrients.

TABLE 2

| Compound: | Expanded clay Series A | | Control Series B | | Tablets Series C | |
|---|---|---|---|---|---|---|
| | weight (g) | volume (cm³) | weight (g) | volume (cm³) | weight (g) | volume (cm³) |
| 1-4 mm Liapor R | 304 | 343 | | | | |
| 0-2 mm Liapor K | 1 | 1 | | | | |
| 2-4 mm sand | | | 530 | 196 | 505 | 187 |
| 4-mm tablets | | | | | 14 | 9 |
| 1-2 mm sand | | | 397 | 147 | 397 | 147 |
| 0.5-1 mm sand | 397 | 147 | 397 | 147 | 397 | 147 |
| 0.25-0.5 mm sand | 346 | 128 | 346 | 128 | 346 | 128 |
| 0.125-0.25 mm sand | 186 | 69 | 186 | 69 | 186 | 69 |
| CEMI 42.5N | 384 | 122 | 384 | 122 | 384 | 122 |
| Water | 192 | 192 | 192 | 192 | 192 | 192 |
| Total: | 1810 | 1002 | 2432 | 1001 | 2421 | 1001 |

Additional 61 ml water was added to the 304 gram of expanded Liapor clay particles in series A before addition to the mortar mixture to compensate for water being absorbed by the porous particles. For each series, ingredients were mixed for 10 minutes using a bench top mortar mixture prior to casting of specimens. For each series, a total number of 12 cubes with dimensions of 4×4×4 cm were cast. After one day specimens were demolded and kept in closed plastic bags at room temperature for further curing until time of compressive strength testing. At 3, 7 and 28 days curing sets of 4 cubes of each series were subjected to compressive loading until failure occurred. Maximum loading capacity of each specimen was recorded and average and standard deviation of each subset of 4 specimens was calculated.

TABLE 3

| | compressive strength Newton/mm² | | |
|---|---|---|---|
| | Expanded clay | Control | Tablets |
| 3 days | 9.0 | 11.8 | 10.2 |
| 7 days | 16.9 | 22.9 | 21.7 |
| 28 days | 23.8 | 27.9 | 32.0 |

From these results it can be concluded that addition of self-healing agent in form of tablets significantly improves compressive strength properties in comparison with addition of healing agent in form of expanded clay particles according to prior art, as compressive strength of tablet-amended mortar specimens was 113, 128 and 134% of that of expanded clay-amended mortar specimens at day 3, 7 and 28 respectively.

Moreover, compressive strength development of tablet-amended specimens overtook that of control specimens during the curing period and reached at 28 days a value of 115% compared to the control specimens.

Photographic pictures taken from tablet-amended specimens split after 28 days curing show that coated tablets embedded in the mortar matrix remained largely intact.

Healing Agent Preparation

The two types of bacteria-based healing agent used for the preparation of mortar specimens were prepared as follows.

1) Expanded Clay Particles Impregnated with Bacterial Spores and Nutrients.

These particles were prepared according to prior art. A batch of Liapor Sand 1/4 R (1-4 mm round particles, Liapor GmbH, Germany) was put in the lower compartment of a glass vessel and covered by a 1-mm weighted grid sieve. The vessel was subsequently evacuated using a Vacuubrand diaphragm vacuum pump. Via a side inlet, a saturated calcium lactate pentahydrate (70 g/L) solution amended with yeast extract (1.4 g/L) and sodium glutamate (1.4 g/L) was led into the vessel until evacuated expanded clay particles were completely covered by the liquid solution after which the vacuum was slowly released. The liquid saturated expanded clay particles were subsequently oven dried in an air ventilated oven at 70° C. A separate batch of Liapor Sand K 0/2 (0-2 mm crushed particles, Liapor GmbH, Germany) was similarly evacuated and saturated with a *Bacillus cohnii* DSM 6307 spore suspension and subsequently oven dried at 70° C. After drying, the Liapor Sand 1/4 R batch expanded clay particles contained 16.2 g calcium lactate pentahydrate, 0.32 g yeast extract and 0.32 g sodium glutamate per kg. The Liapor Sand K 0/2 batch contained $5*10^8$ bacterial spores per gram.

2) Coated Pressed Powder Tablets

Coated pressed powder tablets were prepared by pressing a powder mixture composed of calcium lactate pentahydrate, yeast extract, sodium glutamate and dried zeolite powdered bacterial spore mixture (weight ratio 50:1:1:0.1) using a TDP-1 single-punch tablet press into 4-mm diameter tablets. The dried zeolite powdered bacterial spore mixture contained $1.7*10^{10}$ *Bacillus cohnii* spores per gram zeolite powder. The obtained tablets were subsequently coated by submerging them shortly in an epoxy resin solution (Struers, EpoFix Resin) and drying on a 1-mm aluminum grid sieve in an air ventilated oven for 7 days at 37° C. The epoxy resin solution was prepared by mixing 5 weight units of epoxy resin to 1 weight unit curing agent according to the manufacturers' specifications (Struers GmbH, Germany).

The two types of healing agents were added to the mortar mixtures for preparation of expanded clay-based- and tablet-based mortar specimens in quantities listed in Table 2. Healing agent-containing mortar specimens prepared in this way (series A and C) contained 4.9 g calcium lactate pentahydrate per $dm^3$ mortar mixture (series A) and 13.2 g calcium lactate pentahydrate per $dm^3$ mortar mixture (series C). The tablet-based mortar specimens (series C) thus contained a 2.7 times higher concentration of healing agent than the expanded clay-based mortar specimens.

The tablet-based mortar specimens contained a 2.7-fold higher concentration of healing agent than the expanded clay-based mortar specimens. In terms of volume, however, the healing agent in the tablet-based mortar specimens represented less than 1% of the mortar specimens' volume, while that of the expanded clay-based mortar specimens amounted to almost 35%. While the porous expanded clay particles can act as reservoir for the healing agent, only part of its volume can effectively used for this purpose due to limited connectivity of internal pores. Therefore, relatively high volumes of healing agent-impregnated expanded clay particles have to be applied in order to reach a certain amount of healing agent in the mortar specimens. Application of expanded clay particles, however, result in a substantial compressive strength loss of the resulting mortar specimens when comparing compressive strength development of expanded clay-based specimens (Series A) and control specimens (Series B). After 28 days curing, strength of expanded clay based mortar specimens reached 85% of the strength of control mortar specimens. However, tablet-based mortar specimens reached 115% of the strength of control specimens after 28 days curing.

The results of these further experiments thus show that addition of healing agent in form of coated tablets instead of impregnated expanded clay particles to the mortar mixture yield mortar specimens with substantially improved compressive strength properties.

Hence, the present invention may solve prior art problems, as (substantially leakage-proof) tablets containing the actual healing agent may neither interfere with either the workability of the liquid mixture ("cementious material") nor negatively affect properties of either mixture or final material (hardened concrete), even when applied in large quantities. During crack formation in cementious based constructions, the particles also crack, and healing agent is released.

The invention claimed is:

1. A process for the production of a cementious material, comprising mixing cement starting materials and a particulate healing agent to provide the cementious material, wherein the healing agent comprises coated particles, wherein the coated particles have a coating thickness in the range 5 μm-2 mm, wherein the coated particles comprise bacterial material and additive, and wherein the bacterial material is selected from the group consisting of a bacterium, a lyophilized bacterium and a bacterial spore of a bacterium.

2. The process according to claim 1, wherein the bacterium is selected from the group consisting of aerobic bacteria.

3. The process according to claim 1, wherein the bacterium is selected from the group consisting of anaerobic bacteria.

4. The process according to claim 1, wherein the bacterium is selected from the group consisting of bacteria that can form a phosphate or a carbonate precipitate in an alkaline medium.

5. The process according to claim 1, wherein the bacterium is selected from the group of genera consisting of *Planococcus*, *Bacillus* and *Sporosarcina*.

6. The process according to claim 1, wherein the additive comprises a calcium compound.

7. The process according to claim 6, wherein the additive comprises one or more compounds selected from the group consisting of calcium formate, calcium acetate, calcium lactate, and calcium gluconate.

8. The process according to claim 1, wherein the additive comprises one or more compounds selected from the group consisting of an organic compound and a phosphor compound.

9. The process according to claim 8, wherein the additive comprises one or more compounds selected from the group consisting of a yeast extract, a peptone, a carbohydrate, a fatty acid, an amino acid, a lactate, a glutamate, an aspartate, a maleate, a formate, a pyruvate, a sugar and a phytate.

10. The process according to claim 1, wherein the additive comprises trace elements.

11. The process according to claim 1, wherein the additive comprises (1) one or more compounds selected from the group consisting of calcium formate, calcium acetate, calcium lactate, calcium gluconate, a carbohydrate, a fatty acid, a amino acid, a lactate, a maleate, a formate, a sugar, a pyruvate and a phytate and (2) a bacterial growth factor selected from the group consisting of a yeast extract, a peptone, an aspartate, a glutamate and trace elements.

12. The process according to claim 1, where the additive comprises (a) a calcium compound, (b) one or more of an organic compound and a phosphor compound, (c) trace elements and (d) one or more of a yeast extract, a peptone, an aspartate, and a glutamate.

13. The process according to claim 1, wherein the weight ratio bacterial material:additive of the particulate healing agent is in the range of 1:10,000-1:1,000,000.

14. The process according to claim 1, wherein the coated particles comprise at least 50 wt. % bacterial material and additive, relative to the total weight of the coated particles.

15. The process according to claim 1, wherein the coated particles have mean dimensions in the range of 0.2-4 mm.

16. The process according to claim 1, wherein the coating comprises a (co)polymer based coating based on one or more monomer types selected from the group comprising glycolide, lactide, ε-caprolactone, δ-valerolactone, N-vinylcaprolactam, 3,6-dimethyl-1,4-dioxane-2,5-dione, glycosyloxyethyl methacrylate, 1,6-bis(p-acetoxycarbonylphenoxy) hexane and (3S)-cis-3,6-dimethyl-1,4-dioxane-2,5-dione.

17. The process according to claim 1, wherein the coating comprises an epoxy based (co)polymer.

18. The process according to claim 1, wherein the coated particles have a mean particle hardness in the range of 3-9 according to Mohs scale.

19. The process according to claim 1, wherein the weight ratio of the cement starting materials to the particulate healing agent is in the range of 2,000:1-20:1.

20. The process according to claim 1, wherein the weight ratio of the cement starting materials to the bacterium is in the range of $1.10^6:1-1.10^8:1$.

21. A process for the production of a cementious material, comprising mixing cement starting materials and a particulate healing agent to provide the cementious material, wherein the healing agent comprises coated particles, wherein the coated particles comprises a (co)polymer-based coating, wherein the coated particles comprise bacterial material and additive, and wherein the bacterial material is selected from the group consisting of a bacterium, a lyophilized bacterium and a bacterial spore of a bacterium.

22. The process according to claim 21, wherein the (co) polymer-based coating is based on one or more monomer types selected from the group consisting of glycolide, lactide, ε-caprolactone, δ-valerolactone, N-vinylcaprolactam, 3,6- dimethyl-1,4-dioxane-2,5-dione, glycosyloxyethyl methacrylate, 1,6-bis(p-acetoxycarbonylphenoxy)hexane, and (3S)-cis-3,6-dimethyl-1,4-dioxane-2,5-dione.

23. The process according to claim 21, wherein the bacterium is selected from the group consisting of aerobic bacteria.

24. The process according to claim 21, wherein the bacterium is selected from the group consisting of anaerobic bacteria.

25. The process according to claim 21, wherein the bacterium is selected from the group consisting of bacteria that can form a phosphate or a carbonate precipitate in an alkaline medium.

26. The process according to claim 21, wherein the bacterium is selected from the group of genera consisting of *Planococcus*, *Bacillus* and *Sporosarcina*.

27. The process according to claim 21, wherein the additive comprises a calcium compound.

28. The process according to claim 27, wherein the additive comprises one or more compounds selected from the group consisting of calcium formate, calcium acetate, calcium lactate, and calcium gluconate.

29. The process according to claim 21, wherein the additive comprises one or more compounds selected from the group consisting of an organic compound and a phosphor compound.

30. The process according to claim 29, wherein the additive comprises one or more compounds selected from the group consisting of a yeast extract, a peptone, a carbohydrate, a fatty acid, an amino acid, a lactate, a glutamate, an aspartate, a maleate, a formate, a pyruvate, a sugar and a phytate.

31. The process according to claim 21, wherein the additive comprises trace elements.

32. The process according to claim 21, wherein the additive comprises (1) one or more compounds selected from the group consisting of calcium formate, calcium acetate, calcium lactate, calcium gluconate, a carbohydrate, a fatty acid, a amino acid, a lactate, a maleate, a formate, a sugar, a pyruvate and a phytate and (2) a bacterial growth factor selected from the group consisting of a yeast extract, a peptone, an aspartate, a glutamate and trace elements.

33. The process according to claim 21, where the additive comprises (a) a calcium compound, (b) one or more of an organic compound and a phosphor compound, (c) trace elements and (d) one or more of a yeast extract, a peptone, an aspartate, and a glutamate.

34. The process according to claim 21, wherein the weight ratio bacterial material:additive of the particulate healing agent is in the range of 1:10,000-1:1,000,000.

35. The process according to claim 21, wherein the coated particles comprise at least 50 wt. % bacterial material and additive, relative to the total weight of the coated particles.

36. The process according to claim 21, wherein the coated particles have mean dimensions in the range of 0.2-4 mm.

37. The process according to claim 21, wherein the coated particles have a coating thickness in the range 5 µm-2 mm.

38. The process according to claim 21, wherein the coating comprises an epoxy based (co)polymer.

39. The process according to claim 21, wherein the coated particles have a mean particle hardness in the range of 3-9 according to Mohs scale.

40. The process according to claim 21, wherein the weight ratio of the cement starting materials to the particulate healing agent is in the range of 2,000:1-20:1.

41. The process according to claim 21, wherein the weight ratio of the cement starting materials to the bacterium is in the range of $1.10^6:1-1.10^8:1$.

* * * * *